US010550990B2

(12) United States Patent
Stoltzfus et al.

(10) Patent No.: US 10,550,990 B2
(45) Date of Patent: Feb. 4, 2020

(54) PROTECTIVE SHIELD FOR CONCRETE HOSE JOINTS

(71) Applicant: Somero Enterprises, Inc., Ft. Myers, FL (US)

(72) Inventors: Daniel R. Stoltzfus, Narvon, PA (US); Jacob R. Stoltzfus, Coatesville, PA (US)

(73) Assignee: SOMERO ENTERPRISES, INC., Ft. Myers, FL (US)

( * ) Notice: Subject to any disclaimer, the term of this patent is extended or adjusted under 35 U.S.C. 154(b) by 0 days.

(21) Appl. No.: 16/423,247

(22) Filed: May 28, 2019

(65) Prior Publication Data

US 2019/0277432 A1    Sep. 12, 2019

Related U.S. Application Data

(63) Continuation of application No. 14/883,209, filed on Oct. 14, 2015, now Pat. No. 10,302,241.

(60) Provisional application No. 62/072,595, filed on Oct. 30, 2014.

(51) Int. Cl.
*F16L 57/00* (2006.01)
*F16L 35/00* (2006.01)

(52) U.S. Cl.
CPC ............. *F16L 57/005* (2013.01); *F16L 35/00* (2013.01)

(58) Field of Classification Search
CPC ................................ F16L 57/005; F16L 35/00
See application file for complete search history.

(56) References Cited

U.S. PATENT DOCUMENTS

| 410,816 | A | 9/1889 | Walker et al. |
|---|---|---|---|
| 3,344,393 | A | 9/1967 | Hendee |
| 4,522,435 | A | 6/1985 | Miller et al. |
| 4,615,543 | A | 10/1986 | Cannon |
| 4,643,505 | A | 2/1987 | House et al. |
| 4,741,559 | A | 5/1988 | Berghman |
| 4,838,465 | A | 6/1989 | Metzger |
| 5,895,076 | A | 4/1999 | Elliott |
| 6,588,976 | B2 | 7/2003 | Quenzi et al. |
| 6,913,041 | B2 | 7/2005 | Lehnhardt et al. |
| 7,938,457 | B2 | 5/2011 | Weinhandl et al. |
| 8,312,957 | B1 | 11/2012 | Stoltzfus |
| 10,302,241 | B2 | 5/2019 | Stoltzfus |
| 2008/0302923 | A1 | 12/2008 | Ruonavaara et al. |
| 2016/0084423 | A1 | 3/2016 | Belisle |

*Primary Examiner* — James M Hewitt, II
(74) *Attorney, Agent, or Firm* — Honigman LLP

(57) ABSTRACT

A protective shield device is disposed at the joint between connected concrete hoses to protect the joint connecting one concrete hose to another from accidentally catching on an obstruction on the surface over which the concrete hose joint is moved during operation and disconnecting the two concrete hoses. The protective shield device is formed by two housing portions that are hinged on one side and connected by one or more retaining elements to surround and encapsulate the concrete hose joint. The closed protective shield device has a larger central portion to accommodate the joint structure, and narrower end portions to provide no protruding structure that will catch any underlying obstructions that could cause the enclosed joint latch to be exposed.

21 Claims, 4 Drawing Sheets

Fig. 5
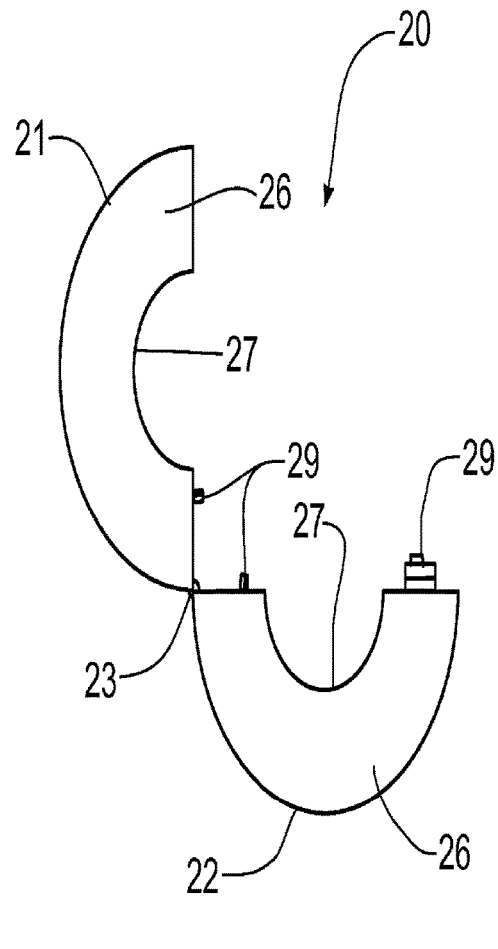
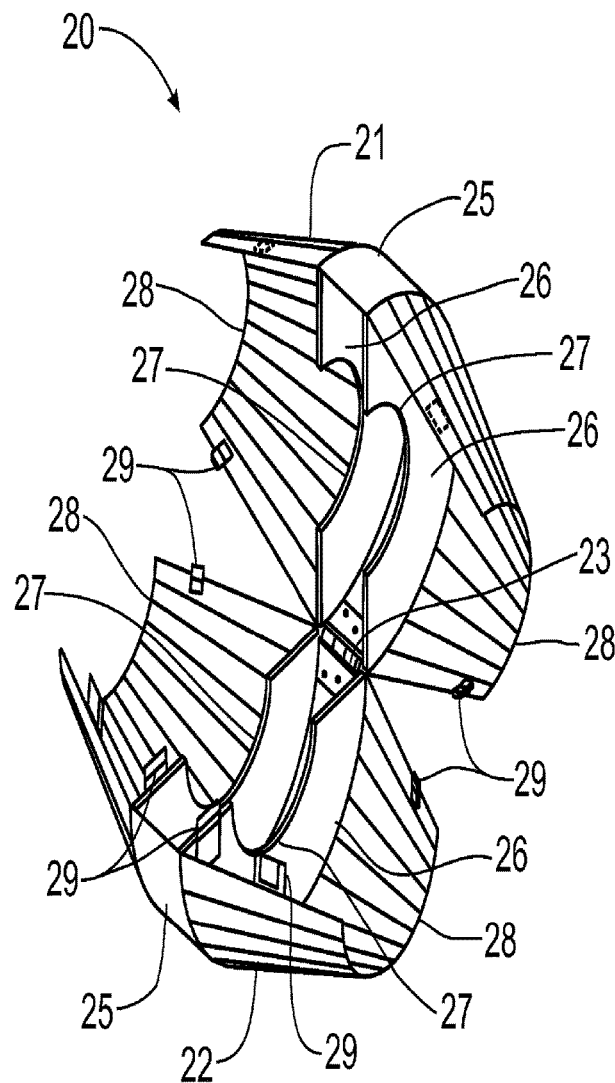
Fig. 6

PROTECTIVE SHIELD FOR CONCRETE HOSE JOINTS

CROSS-REFERENCE TO RELATED APPLICATIONS

This application is a continuation of U.S. patent application Ser. No. 14/883,209, filed Oct. 14, 2015, now U.S. Pat. No. 10,302,241, which claims domestic priority on U. S. provisional application Ser. No. 62/072,595, filed Oct. 30, 2014, the content of which is incorporated herein by reference.

FIELD OF THE INVENTION

This invention relates generally to devices for the placement of concrete to form the floor of a building or other large generally planar structure and, more particularly, to a protective apparatus covering the joint between concrete hoses to maintain the integrity of the joint when the hoses are moved during the placement of concrete in the large generally planar structure.

BACKGROUND OF THE INVENTION

It is known to use a concrete pumping truck and pipe or a boom truck to place concrete at a targeted site. The boom truck incorporates boom and pipe apparatus to pump flowable concrete mixture to a remote location, which can be at a greater distance from the pumping truck or at a different elevation, such as an upper floor or a basement of a building. It is difficult to use conventional boom trucks between floors of buildings because there may not be enough clearance between the floor and the overhead structures to reach the entire floor with the articulated boom. Furthermore, the boom of the concrete pumping truck may also not be sufficiently long to reach most remote portions of the floor on which the concrete is being deposited, which would require the use of additional pipes or hoses to carry and place the concrete at those remote locations. Similar limitations apply to large generally planar structures, such as the surface of a bridge, for which a concrete pour is needed.

In areas where boom trucks cannot reach or where a concrete pumping truck is available while a boom truck is not, a movable pipe or multiple sections of pipe or hose may be connected to the concrete pump and extended into the structure in order to reach the remote portions of the structure. Although such systems are capable of reaching the remote areas from the concrete pumps, the pipes and hoses filled with concrete mixture are difficult to manipulate in order to properly place the concrete at the remote portions due to the substantial weight of the filled pipes and/or hoses. Mobile devices are known in the art for supporting the concrete filled pipes and hoses to assist in the positioning and movement of the pipes and hoses to allow an efficient placement for the concrete mixture throughout the floor.

One known mobile device for manipulating the concrete filled pipes or hoses can be found in U.S. Pat. No. 6,588,976 issued to Philip Quenzi, et al. on Jul. 8, 2008, in which the concrete pipes or hoses are carried on top of mobile devices to manipulate the placement of concrete into the remote corners of the building floor. The concrete hoses are depicted as being carried on top of the mobile devices; however, at FIG. 66, the Quenzi patent shows the use of flexible concrete hoses having joints that are protected by a pan, which is commonly known in the industry, as noted below. The concrete pipe holding device is pivoted to the chassis to permit the movement of the wheeled apparatus across the sub grade surface of the floor on which the concrete mixture is to be deposited. The four-wheeled apparatus is steerable by turning pairs of wheels.

An alternative mobile apparatus is depicted in U.S. Pat. No. 8,312,957, granted on Nov. 20, 2012, to Daniel R. Stoltzfus, in which the flexible concrete hose is carried beneath the mobile devices for placement into the remote places of a building floor or other generally planar structures requiring a concrete pour. In the use of mobile apparatus for moving and placing concrete hoses, such as disclosed in the Stoltzfus patent, the length of concrete hose needed to span the distance from the concrete pump to the first mobile device will likely require the use of multiple fixed length concrete hoses. These concrete hoses are clamped together at joints secured typically by overcenter clamps.

Operators utilizing such mobile devices for moving concrete hoses typically place underneath each joint a flat pan, such as depicted in FIG. 66 of the aforementioned Quenzi patent, so that the joint can move over the top of wire reinforcing or other structure to be incorporated into the concrete pour. Such flat pans can tip with the movement of the concrete hose laterally across the surface to receive the concrete pour and become engaged with the underlying reinforcing wire or rods, causing the pans to flip over and expose the overcenter clamp at the joint between the concrete hoses to subsequent engagement with the underlying structure. The unwanted engagement between the overcenter clamp and underlying reinforcement structure can result in the overcenter clamp opening and, thus, disconnecting the two concrete hoses.

Coupling joints for hoses are known in the art, as is represented in U.S. Pat. No. 4,522,435, granted to William P. Miller, et al., on Jun. 11, 1985, in which a crimped seal is utilized. An overcenter clamping mechanism for the joint between concrete hoses is disclosed in U.S. Pat. No. 6,913,041, granted on Jul. 5, 2005, to Gary D. Lehnhardt, et al. An overcenter clamp is also disclosed on the apparatus for manually moving concrete hoses, as is disclosed in U.S. Pat. No. 4,838,465, granted to Lynn Metzger on Jun. 13, 1989.

It would be desirable to provide an apparatus that would have improved reliability in protecting overcenter clamps at joints between fixed length concrete hoses from exposure to underlying reinforcement structure while concrete is being pumped through the concrete hoses to remote mobile devices utilized to effect a desired placement of the concrete. It would further be desirable to provide an apparatus for protecting concrete hose joints that would move with the concrete hoses without exposing the clamping mechanism to engagement with underlying reinforcement structure.

SUMMARY OF THE INVENTION

It is an object of this invention to overcome the disadvantages of the prior art by providing a protective shield device for encapsulating a joint mechanism connecting two concrete hose segments.

It is another object of this invention to provide a protective shield device for joints connecting two concrete hoses to prevent the concrete hoses from being disconnected during movement while being operated to pump concrete from one location to another.

It is an advantage of this invention that the protective shield device encapsulates the closure members forming the joint between two concrete hoses being used to pump concrete from one location to another.

It is a feature of this invention that the protective shield device is formed as two hollow shells hinged at one side thereof to facilitate mounting the protective shield device onto the joint between two interconnected concrete hoses.

It is another feature of this invention that the closure mechanism for the protective shield device is located internally of the device.

It is another advantage that the internal location of the closure mechanism for the protective shield device prevents accidental engagement thereof while being moved across the surface on which concrete is being poured.

It is still another feature of this invention that the closure device is an apparatus utilizing friction to maintain the hinged hollow shells in a closed orientation protecting the joint between concrete hoses being used to pump concrete from one location to another.

It is a further object of this invention to provide a protective shield device to protect the joint between two concrete hoses used to pump concrete from one location to another, which is durable in construction, inexpensive of manufacture, carefree of maintenance, facile in assemblage, and simple and effective in use.

These and other objects, features and advantages are accomplished according to the instant invention by providing a protective shield device that can be mounted on concrete hoses to protect the joint connecting one concrete hose to another from accidentally catching on an obstruction on the surface over which the concrete hose joint is moved during operation and disconnecting the two concrete hoses. The protective shield device is formed by two hollow shells that are hinged on one side and connected by friction closure members to surround and encapsulate the concrete hose joint. The assembled protective shield device is preferably in the shape of an ovoid with a larger central portion to accommodate the joint structure, and narrower end portions to provide no protruding structure that will catch any underlying obstructions that could cause the enclosed joint latch to be exposed. The protective shield device can be opened by forcing the two shell members apart, or by using a mechanically disengagable latch.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a cross-sectional view of the protective shield device corresponding to lines 5-5 of FIG. 3; and FIG. 6 is a perspective view of the protective shield device shown in FIG. 3.

DETAILED DESCRIPTION OF THE PREFERRED EMBODIMENT

Figure 1:
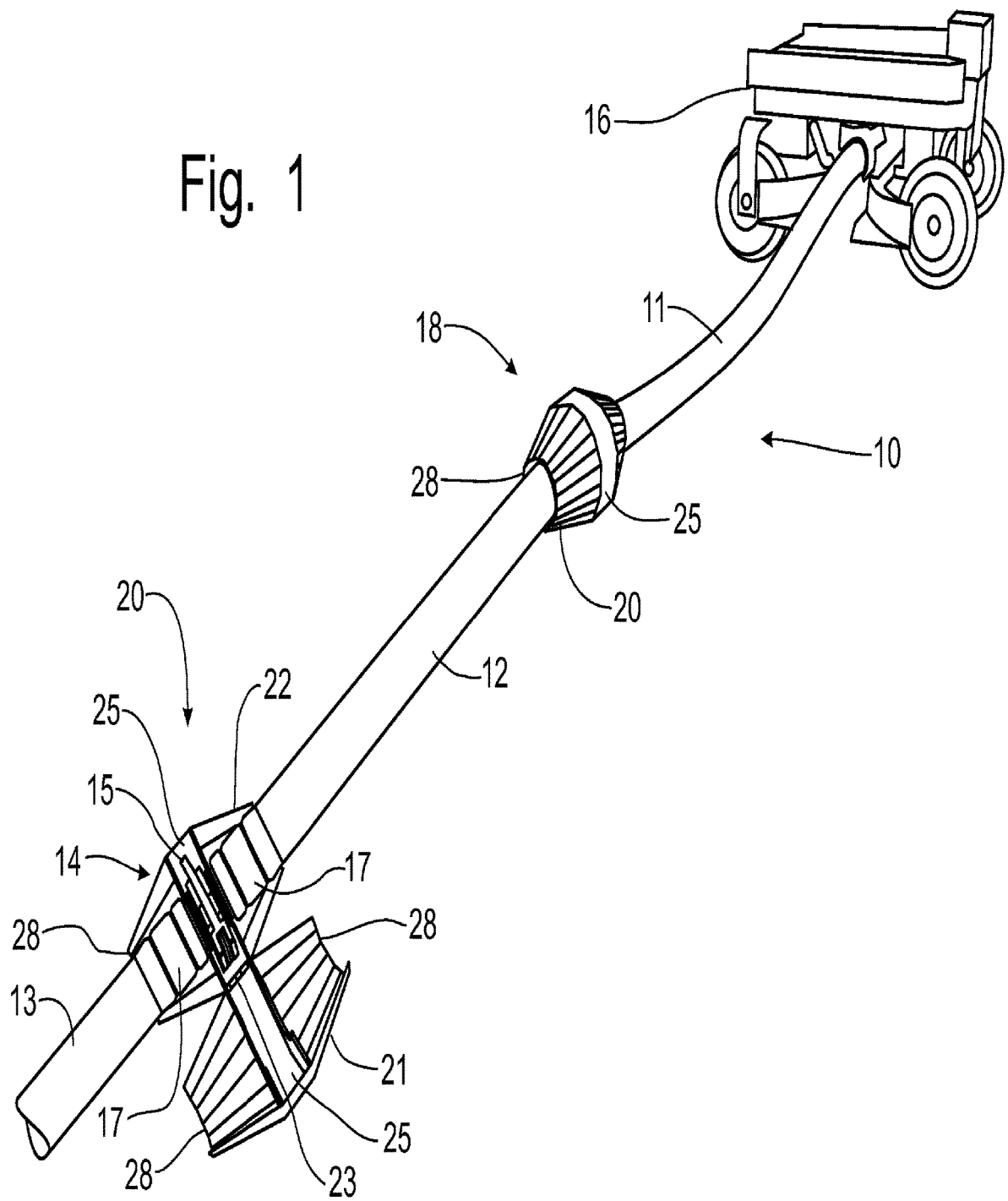
FIG. 1 is a perspective view of coupled concrete hoses being carried by a mobile device for moving the concrete hoses at a construction site requiring the placement of a concrete pour from a concrete pump through the concrete hoses, the joint between the concrete hoses being protected by the protective shield apparatus incorporating the principles of the instant invention, one of the protective shield devices being opened to permit access to the joint structure between the concrete hoses.
Figure 2:
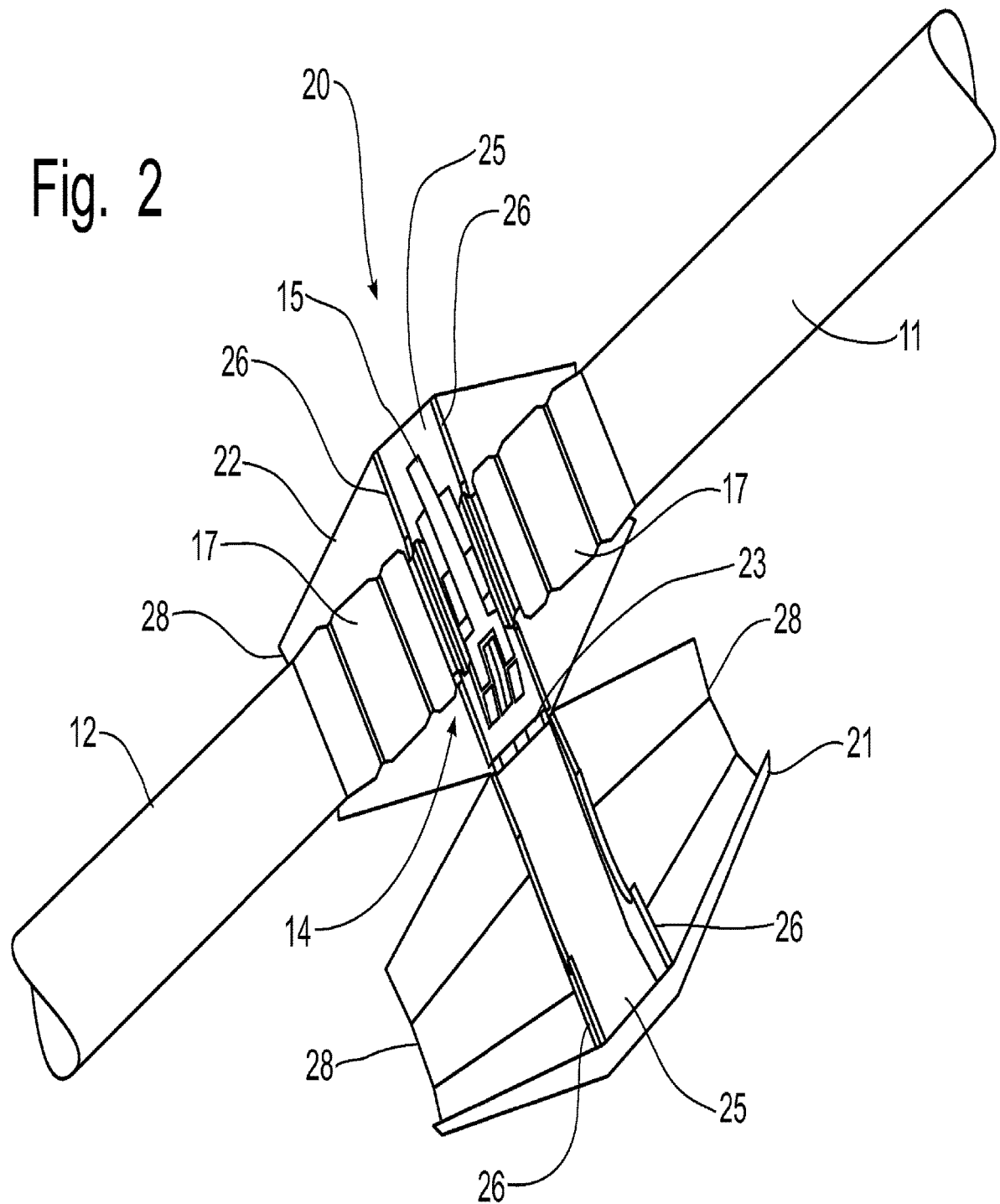
FIG. 2 is an enlarged top plan view of the joint between coupled concrete hoses, as shown in FIG. 1, which is secured by an overcenter clamping mechanism positioned within a protective shield apparatus incorporating the principles of the instant invention, the protective shield apparatus being opened to permit access to the joint structure.
Figures 3, 4:
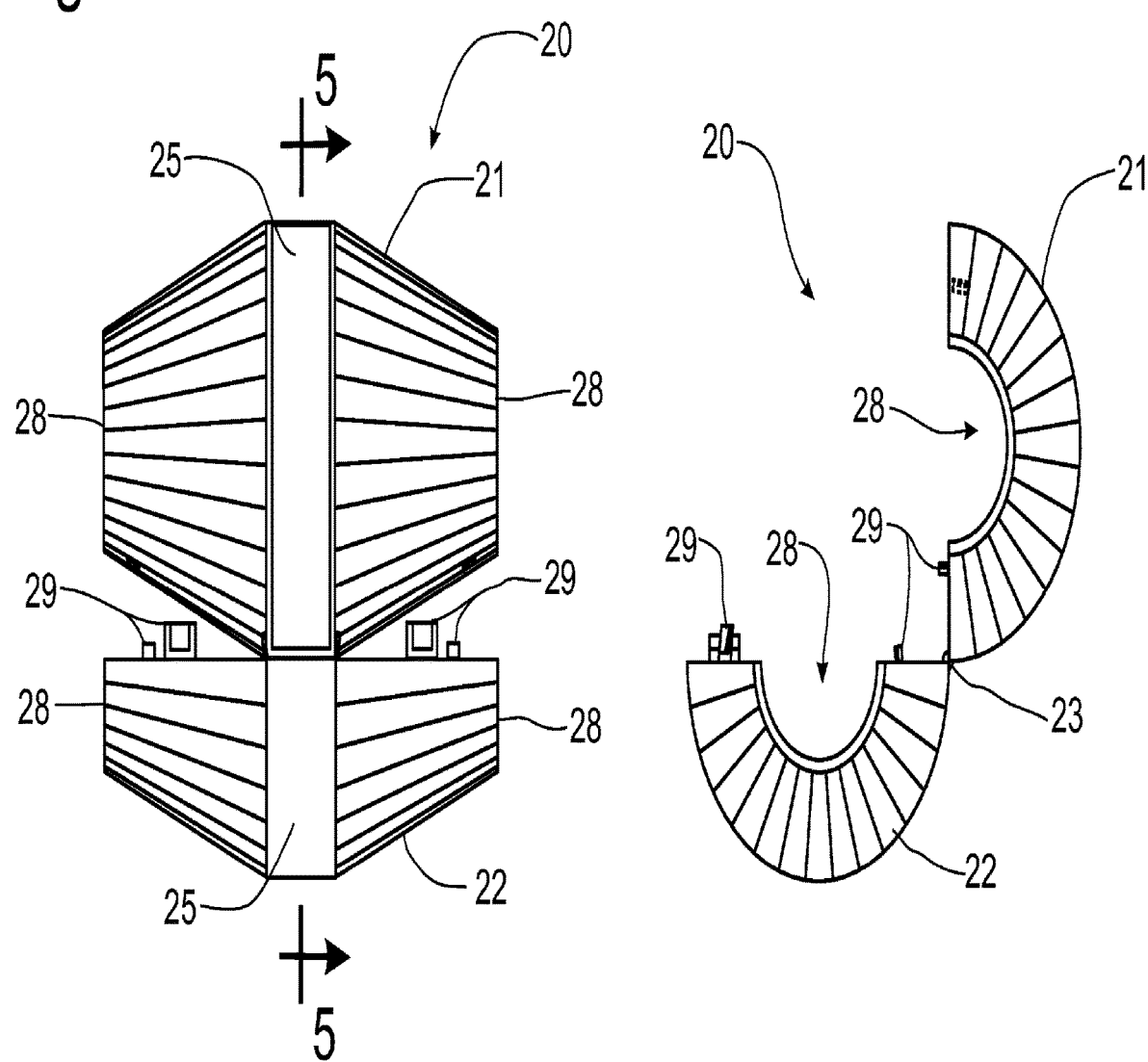
FIG. 3 is a side elevational view of the protective shield device, incorporating the principles of the instant invention, depicted in a partially opened configuration.
FIG. 4 is an end elevational view of the protective shield device as shown in FIG. 3.

Referring to FIGS. 1 and 2, a mobile apparatus for supporting and moving a concrete pump hose or rigid pipe, and carrying a coupled concrete hose structure can best be seen. The joints between the fixed length concrete hoses are protected by a protective shield device incorporating the principles of the instant invention. As a matter of general reference, the coupled concrete hose 10 is typically connected to a concrete pump that pushes concrete through the hose 10 to a remote location where the concrete is discharged from the concrete hose 10 and finished into the configuration desired by the contractor. Typically, the concrete hose 10 is formed by connecting together a plurality of fixed length concrete hose segments 11, 12, and 13 which are joined together at a joint 14 and secured by a clamping mechanism 15, such as an overcenter clamp 15, as is known in the art.

The concrete hose 10 is normally supported on a mobile apparatus 16 that is operable to move the concrete hose around the structure (not shown) being constructed and requiring a concrete pour. The structure and operation of a mobile apparatus 16 for moving concrete hoses 10 is shown and described in U.S. Pat. No. 8,312,957, granted on Nov. 20, 2012, to Daniel R. Stoltzfus, the content of which is incorporated herein by reference. The movement of the mobile apparatus 16 drags the concrete hose 10 across the reinforcing wire and reinforcing rods that are placed on the structure (not shown) to be embedded within the concrete pour. The movement of the concrete hose can be longitudinal or lateral, depending on the movement of the mobile device 16 and the requirements of placing concrete within the structure.

As can be seen in FIGS. 1-6, the joints between the fixed length concrete hose segments 11-13 can be protected by a protective shield device 20 that encompasses the joint mechanism 15. The protective shield device 20 is preferably formed in two members 21, 22 that are pivotally connected by a hinge 23. Each member 21, 22 of the protective shield device 20 preferably forms half of the device 20 and is provided with latching devices 29 that allow the two members 21, 22 to be latched together in a closed configuration as depicted at 18 in FIG. 1. Once the two members 21, 22 of the protective shield device 20 are latched together by interengaged latch members 29 on opposing members 21, 22, the latched members 21, 22 form an ovoid structure that can either slide or roll over the underlying reinforcing structure on which the concrete hose 10 is supported for movement in the placement of the concrete pour at the construction site.

Each member 21, 22 of the protective shield device 20 is formed with a central portion 25 that forms a cylindrical shape when the two members 21, 22 are latched together, The central portion 25 is reinforced internally by a pair of arcuate supports 26 having a central opening 27 for receiving a concrete hose end portion 17. From the central support 26 to the opposing ends of the shield members 21, 22 the shape of the protective shield device 20 is frusto-conical with the larger end of the frusto-conical shape being located at the central support 26 and tapering therefrom to an end opening 28 on opposing sides of the central portion 25 that is slightly larger than the diameter of the concrete hose segment 11-13 exiting the protective shield device 20.

In operation, the protective shield device 20 is opened, as depicted in FIG. 2, and the joint 14 is placed on top of one member 22 of the protective shield device 20 so that the joint mechanism 15, such as the overcenter clamp 15, is positioned between the arcuate supports 26 of the central section 25. The enlarged diameter of the cylindrical central portion 25 accommodates the extra bulk of the joint mechanism 15 between the arcuate supports 26, while the central openings 27 in the arcuate supports 26 allow the passage of the hose structure that extends out of the opposing end openings 28.

Once the joint 14 is properly seated within the central portion 25 of the protective shield device 20, the other member 21 of the device 20 is pivoted about the hinge 23 and closed against the other member 22 that has received the concrete hose joint 14 so that the interengaged latch devices 29 latch the two members 21, 22 together around the concrete hose joint 14. The cylindrical shape of the central portion 25, as well as the opposing frusto-conical ends, facilitates the movement of the protective shield device 20 over the underlying reinforcing wire or rods without allowing the joint mechanism 15 housed inside of the device 20 to catch protruding structure. The smooth exterior surface of the central portion 25 enhances the ability of the protective shield device 20 to slide over the underlying reinforcing structure, as well as to roll if such movement is required to move the concrete hoses from one location to another.

The ovoid protective shield device 20 has no protruding structure that will catch the underlying reinforcing wire or rods and cause the enclosed overcenter latch 15 to be exposed to engagement with the underlying structure. In addition, the sloped surfaces of the ovoid structure from the central portion to the end portions facilitate the sliding of the protective shield device over the underlying surface on which the concrete hoses are supported. Accordingly, the protective shield device 20 protects the concrete hose joint 14 while being moved about the structure being constructed. Once the concrete hose joint 14 is to be disconnected to allow one or more of the fixed concrete hose segments 11-13 to be removed, the two members 21, 22 are spread apart by disengaging the latch members 29 and exposing the concrete hose joint 14 to access and manipulation of the joint mechanism 15. The protective shield devices 20 can be re-used as they are preferably formed of metal to absorb the forces associated with the protection of the joint mechanism 15, and the weight of the filled concrete hoses as the apparatus is moved across the underlying reinforcing structure typically found on such construction sites.

One skilled in the art will recognize that a latch release (not shown) could be incorporated into the structure of the protective shield device 20 to mechanically disengage the opposing latching members 29; however, a simple frictional engagement of the opposing latch members 29 has been found to be satisfactorily operable to retain the protective shield device 20 in a closed position during movement of the concrete hoses over the underlying reinforcing structure. Furthermore, one skilled in the art will recognize that the two opposing members 21, 22 of the protective shield device 20 do not have to be mirror images such that each member 21, 22 literally forms half of the device 20. One of the members 21, 22 could be substantially large than the other member so long as the opening formed when the smaller member is pivoted about the hinge 23 to allow placement of the joint mechanism 15 is sufficiently large to accommodate the placement of the concrete hose joint 14 into the interior of the device 20.

In addition, one skilled in the art will recognize that the hinge 23 pivotally connecting the two members 21, 22 is provided as an operational convenience that keeps the two members 21, 22 connected together and easily operable for movement between the aforementioned opened and closed orientations. Alternatively, the two members 21, 22 could be separate and discrete members that only connect to one another through the interengagement of latching members 29. In such a configuration, the concrete hose joint 14 would be laid on one of the members 22 and the opposing member 21 placed over top of the concrete hose joint 14 and latched to the first member 22 by aligning the latching members 29.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

Having thus described the invention, what is claimed is:

1. A method of encapsulating a joint mechanism connecting end portions of two concrete supply hoses, the method comprising:

providing a shield device comprising first and second housing portions, each having a central portion with a pair of spaced apart arcuate supports disposed thereat, wherein each of the first and second housing portions comprises opposite open ends;

wherein, when the first and second housing portions are joined together so that the shield device is in a closed state, (i) the central portions of the first and second housing portions cooperate to form a central body portion of the closed shield device, and (ii) the opposite open ends and the arcuate supports of the first and second housing portions cooperate to form openings at opposite body ends of the closed shield device;

wherein, when the first and second housing portions are joined together so that the shield device is in the closed state, the arcuate supports and the openings at the opposite body ends define a passageway along the closed shield device;

with the first and second housing portions at least partially separated so that the shield device is in an opened state, disposing end portions of two concrete supply hoses along the first housing portion, with a joint mechanism that joins the concrete supply hoses disposed between the spaced apart arcuate supports of the first housing portion, wherein, with the end portions of the concrete supply hoses disposed along the first housing portion, the concrete supply hoses are received at the respective open ends of the first housing portion;

joining the first and second housing portions so the shield device is in the closed state to secure the concrete supply hoses in and along the passageway of the closed shield device, wherein, with the shield device in the closed state, the arcuate supports retain the joint mechanism at the central body portion of the closed shield device; and with the shield device in the closed state, securing the first and second housing portions together via at least one retaining element.

2. The method of claim 1, comprising hingedly joining the first and second housing portions together via a hinge such that the first and second housing portions pivot to adapt the shield device between the opened state and the closed state.

3. The method of claim 2, wherein the at least one retaining element is disposed at an edge of the first housing portion that is opposite from an edge of the first housing portion where the hinge joins the first and second housing portions.

4. The method of claim 2, wherein the at least one retaining element comprises (i) a first retaining element disposed at an edge of the first housing portion that is opposite from an edge of the first housing portion where the hinge joins the first and second housing portions and (ii) a second retaining element disposed at an edge of the second housing portion that is opposite from an edge of the second housing portion where the hinge joins the first and second housing portions.

5. The method of claim 4, wherein securing the first and second housing portions in the closed state comprises engaging the first and second retaining elements.

6. The method of claim 1, wherein the at least one retaining element is disposed at one or more of the arcuate supports.

7. The method of claim 1, wherein, with the shield device in the closed state, opposite body ends of the closed shield device have an outside cross dimension that is smaller than an outside cross dimension of the central body portion of the closed shield device.

8. The method of claim 7, wherein, with the shield device in the closed state, an outer surface of the closed shield device comprises a truncated conical shape between the central body portion and the respective body end of the closed shield device.

9. The method of claim 8, wherein, with the shield device in the closed state, an outer surface of the central body portion has a circular cross section.

10. The method of claim 1, wherein the first and second housing portions comprise metal housing portions.

11. A shield device for encapsulating end portions of two concrete supply hoses that are connected via a joint mechanism, the shield device comprising:
a body comprising first and second housing portions detachably joined together, wherein the first housing portion is movable relative to the second housing portion to adapt the body between an opened state of the body and a closed state of the body;
wherein the first housing portion comprises a central portion and opposite end portions at opposite sides of the central portion of the first housing portion, and wherein the first housing portion comprises a pair of spaced apart arcuate supports disposed at an inner surface of the first housing portion and extending radially inward therefrom;
wherein the second housing portion comprises a central portion and opposite end portions at opposite sides of the central portion of the second housing portion, and wherein the second housing portion comprises a pair of spaced apart arcuate supports disposed at an inner surface of the second housing portion and extending radially inward therefrom;
wherein, with the body in the closed state, the opposite end portions of the first and second housing portions cooperate to provide respective openings at opposite body ends of the closed body;
wherein, with the body in the closed state, the first and second housing portions and the arcuate supports of the first and second housing portions and the openings at the opposite body ends define a passageway extending longitudinally along and through the closed body;
wherein, with the body in the closed state, the central portions of the first and second housing portions cooperate to form a central body portion, and wherein the central body portion has a larger outside cross dimension than an outside cross dimension of the body ends of the closed body;
wherein, with the body in the opened state, the first and second housing portions are partially separated for receiving the end portions of two concrete supply hoses and the joint mechanism that connects the concrete supply hoses, with the joint mechanism disposed between the spaced apart arcuate supports;
wherein, with the body in the closed state, the spaced apart arcuate supports of the first housing portion align with the spaced apart arcuate supports of the second housing portion for retaining the joint mechanism of the concrete supply hoses at the central body portion; and
at least one retaining element that, with the body in the closed state, secures the first housing portion relative to the second housing portion to retain the joint mechanism and the end portions of the concrete supply hoses in the closed body.

12. The shield device of claim 11, wherein the spaced apart arcuate supports are disposed at an inner surface of the central portions of the first and second housing portions.

13. The shield device of claim 11, wherein the spaced apart arcuate supports at the central portions are located adjacent to and on opposing sides of the joint mechanism that connects the concrete supply hoses when the concrete supply hoses are received in the first and second housing portions at the spaced apart arcuate supports and when the first and second housing portions are secured together via the at least one retaining element.

14. The shield device of claim 11, wherein the first and second housing portions are hingedly joined together via a hinge such that the first housing portion pivots relative to the second housing portion to adapt the body between the opened state and the closed state.

15. The shield device of claim 14, wherein the at least one retaining element is disposed at an edge of the first housing portion that is opposite from an edge of the first housing portion where the hinge hingedly joins the first and second housing portions together.

16. The shield device of claim 14, wherein the at least one retaining element comprises (i) a first retaining element disposed at an edge of the first housing portion that is opposite from an edge of the first housing portion where the hinge hingedly joins the first and second housing portions and (ii) a second retaining element disposed at an edge of the second housing portion that is opposite from an edge of the second housing portion where the hinge hingedly joins the first and second housing portions.

17. The shield device of claim 14, wherein each of the first and second housing portions forms a half of the body.

18. The shield device of claim 11, wherein the at least one retaining element comprises a retaining element at each of the first and second housing portions, and wherein the retaining elements engage one another and secure the first and second housing portions together to retain the body in the closed state.

19. The shield device of claim 11, wherein the closed body comprises a tapered conical shape between the central body portion and each of the opposite body ends.

20. The shield device of claim 19, wherein, with the body in the closed state, an outer surface of the closed body has a circular cross section along a length of the closed body.

21. The shield device of claim 11, wherein the first and second housing portions comprise metal housing portions.

* * * * *